(12) United States Patent
Nodo et al.

(10) Patent No.: US 11,199,474 B2
(45) Date of Patent: Dec. 14, 2021

(54) SENSOR HAVING TUBE CAP RESTRICTING REARWARD MOVEMENT OF HEAT SHIELD TUBE

(71) Applicant: NGK SPARK PLUG CO., LTD., Nagoya (JP)

(72) Inventors: Keiichi Nodo, Seki (JP); Keiichi Noda, Ichinomiya (JP); Ryuta Fukano, Iwakura (JP); Yasuhiro Ishiguro, Nagoya (JP); Shoji Akatsuka, Kasugai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 190 days.

(21) Appl. No.: 16/362,851

(22) Filed: Mar. 25, 2019

(65) Prior Publication Data

US 2019/0310166 A1    Oct. 10, 2019

(30) Foreign Application Priority Data

Apr. 9, 2018   (JP) .............................. JP2018-074482

(51) Int. Cl.
*G01M 15/10*         (2006.01)
(52) U.S. Cl.
CPC ................................ *G01M 15/104* (2013.01)
(58) Field of Classification Search
CPC .................................................. G01M 15/104
See application file for complete search history.

(56) References Cited

U.S. PATENT DOCUMENTS

| | | | | |
|---|---|---|---|---|
| 5,804,050 A | * | 9/1998 | Hayakawa | G01N 27/407 204/408 |
| 6,383,353 B1 | * | 5/2002 | Akatsuka | G01N 27/407 204/424 |
| 6,550,309 B1 | * | 4/2003 | Noda | G01N 27/407 204/424 |

(Continued)

FOREIGN PATENT DOCUMENTS

| JP | 2003-050224 A | 2/2003 |
|---|---|---|
| JP | 2008-003076 A | 1/2008 |

OTHER PUBLICATIONS

Kenichiro Umemoto "Gas Sensor with Heat Shield Tube", Journal of Technical Disclosure No. 2011-500826, Feb. 23, 2011, 8 pages.

(Continued)

*Primary Examiner* — Eric S. McCall
(74) *Attorney, Agent, or Firm* — Sughrue Mion, PLLC

(57) ABSTRACT

Disclosed is a sensor, including: a sensor body having a cylindrical case and a sensor element accommodated in the case; a seal member disposed in a rear end part of the case; lead wires electrically connected to the sensor element and extending from inside to outside of the casing through the seal member; and a cylindrical heat shield tube retained to an outer surface of the case and extending rearward from the case so as to circumferentially surround the seal member and parts of the lead wires, characterized in that: the sensor further includes a cylindrical tube cap made of an elastic material and arranged to restrict a rearward movement of the heat shield tube; the tube cap has formed therein at least one lead wire insertion hole through which the lead wires are inserted; and the tube cap is reduced in diameter and held to the lead wires.

9 Claims, 5 Drawing Sheets

(56) References Cited

U.S. PATENT DOCUMENTS

| | | | | |
|---|---|---|---|---|
| 6,660,143 B1* | 12/2003 | Akatsuka | ........... | G01N 27/4067 204/408 |
| 2001/0002651 A1* | 6/2001 | Akatsuka | ........... | G01N 27/4077 204/427 |
| 2001/0054552 A1* | 12/2001 | Matsuo | ................ | G01N 27/407 204/421 |
| 2005/0016257 A1* | 1/2005 | Isomura | ............. | G01N 27/4077 73/31.05 |
| 2005/0029101 A1* | 2/2005 | Isomura | ............. | G01N 27/4077 204/428 |
| 2006/0237315 A1* | 10/2006 | Matsuo | ............. | G01N 27/4062 204/424 |
| 2007/0167079 A1* | 7/2007 | Akatsuka | ............. | G01N 27/407 439/607.41 |
| 2014/0339081 A1* | 11/2014 | Tahira | ................. | G01N 27/407 204/424 |
| 2015/0330939 A1* | 11/2015 | Tahira | ................ | G01N 27/4078 29/25.03 |
| 2020/0271040 A1* | 8/2020 | Ogawa | ................. | F01N 11/007 |

OTHER PUBLICATIONS

Communication dated Aug. 30, 2021, issued by the Japanese Patent Office in corresponding application No. 2018-074482.

\* cited by examiner

SENSOR HAVING TUBE CAP RESTRICTING REARWARD MOVEMENT OF HEAT SHIELD TUBE

FIELD OF THE INVENTION

The present invention relates to a sensor such as gas sensor for detecting a detection target substance. Hereinafter, the term "front" refers to a sensing side with respect to the direction of an axis of a sensor; and the term "rear" refers to a side opposite the front side.

BACKGROUND OF THE INVENTION

A sensor is mounted on an exhaust pipe of an automatic vehicle to detect the concentration of a detection target gas component in an exhaust gas. This sensor includes: a rubber seal member disposed on a rear end side thereof to provide a seal on the inside of the sensor; and a lead cable inserted through the seal member and drawn out of the sensor. The seal member is however generally low in heat resistance so that, when the sensor is used for a long time in a high-temperature environment, the seal of the sensor may be impaired due to deterioration of the seal member under the action of radiant heat from the outside. Further, the insulating property of the lead cable may be impaired due to melting of an insulating coating of the lead cable under heat.

As a solution to the above problems, Journal of Technical Disclosure No. 2011-500826 discloses an improvement technique for the sensor, in which a heat shield tube is arranged to surround the seal member and the lead cable and is fixed to the lead cable in a non-contact manner by fitting a cylindrical fixing member (called "retainer") of heat-resistant resin in a rear end of the heat shield tube and inserting the lead cable through the retainer. In the disclosed technique, a cable tie is fixed to a part of the lead cable drawn out from a rear end of the retainer so as to prevent a movement of the retainer by contact of the cable tie with the rear end of the retainer.

SUMMARY OF THE INVENTION

However, the ordinary type of cable tie is also generally low in heat resistance. The sensor may thus be difficult to use in a high-temperature environment or face the problem that, when the cable tie becomes loosened and removed during high-temperature use, the retainer and the heat shield tube are slipped off from the rear end side of the sensor. In addition, the retainer is hard and is not deformed so that it is difficult to retain the lead cable by the retainer itself. When the cable tie is loosened, the retainer is easily moved relative to the lead cable so as to allow a movement of the heat shield tube.

In view of the foregoing, it is an object of the present invention to provide a sensor capable of reliably holding a heat shield tube in position and obtaining improvement in heat resistance.

In accordance with a first aspect of the present invention, there is provided a sensor, comprising: a sensor body having a cylindrical case extending in a direction of an axis of the sensor and a sensor element accommodated in the case and configured to detect a detection target substance; lead wires electrically connected to the sensor element and extending from inside to outside of the case; a seal member disposed in a rear end part of the case, with the lead wires being inserted through the seal member; and a cylindrical heat shield tube retained to an outer surface of the case and extending rearward from a rear end of the case so as to circumferentially surround the whole of the seal member and parts of the lead wires exposed outside from the case, wherein the sensor further comprises a cylindrical tube cap made of an elastic material and arranged to restrict a rearward movement of the heat shield tube, wherein the tube cap has, formed therein, at least one lead wire insertion hole through which the lead wires are inserted, and wherein the tube cap is reduced in diameter and held to the lead wires.

In the first aspect, the tube cap is reduced in diameter, with the lead wires being inserted through the lead wire insertion hole of the tube cap, as mentioned above. By such diameter reduction of the tube cap, an inner wall of the lead wire insertion hole is securely brought into close contact with outer surfaces of the lead wires so that the tube cap is retained to the lead wires. Even when an external force is exerted in the direction of the axis, it is likely that the tube cap will be moved relative to the lead wires. It is thus possible to reliably hold the tube cap, that is, reliably hold the heat shield tube in position by restricting a rearward movement of the heat shield tube by the tube cap. Consequently, the sensor is improved in heat resistance.

In accordance with a second aspect of the present invention, there is provided a sensor as described above, wherein at least a rear end part of the tube cap has an outer surface exposed rearward from the heat shield tube, wherein the sensor further comprises a fastening member fitted on the exposed outer surface of the tube cap so that the tube cap is reduced in diameter by the fastening member and thereby held to the lead wires, and wherein the tube cap has, formed on a front end part thereof, either a front-facing surface brought into contact with a rear-facing surface of the heat shield tube so as to restrict a rearward movement of the heat shield tube, or an insertion portion inserted in a rear end part of the heat shield tube and retained to a side wall of the heat shield tube so as to restrict a rearward movement of the heat shield tube.

In the second aspect, the tube cap is largely reduced in diameter by the fastening member. It is thus possible to more reliably hold the tube cap to the lead wires and more reliably hold the heat shield tube in position.

In accordance with a third aspect of the present invention, there is provided a sensor as described above, wherein the tube cap has an insertion portion formed on a front end part thereof, wherein at least the insertion portion of the tube cap is inserted in a rear end part of the heat shield tube, and wherein the heat shield tube is swaged externally at a position corresponding to the insertion portion of the tube cap, whereby the tube cap is reduced in diameter together with the heat shield tube and held to the lead wires.

In the third aspect, the tube cap is reduced in diameter together with the heat shield tube and thereby held to the lead wires. As the number of component parts of the sensor is reduced, it is possible to facilitate manufacturing of the sensor.

In accordance with a fourth aspect of the present invention, there is provided a sensor as described above, wherein the tube cap has the same number of lead wire insertion holes as that of the lead wires so that the lead wires are respectively inserted through the lead wire insertion holes.

In the fourth aspect, the inner walls of the lead wire insertion holes are brought into close contact with the respective outer surfaces of the lead wires by diameter reduction of the tube cap. It is thus possible to more reliably hold the tube cap to the lead wires and more reliably hold the heat shield tube in position.

In accordance with a fifth aspect of the present invention, there is provided a sensor as described above, wherein the tube cap has a front-facing surface formed on the front end part thereof so as to retain the heat shield tube by contact of the front-facing surface with a rear-facing surface of the heat shield tube.

In the fifth aspect, the tube cap is reduced in diameter together with the heat shield tube and thereby retained to the lead wire. In addition, the heat shield tube is retained by the front-facing surface of the tube cap. It is thus possible to more reliably hold the heat shield tube in position.

In accordance with a sixth aspect of the present invention, there is provided a sensor as described above, wherein a rear end part of the tube cap has an outer surface exposed rearward from the heat shield tube, and wherein the sensor further comprises a fastening member fitted on the exposed outer surface of the tube cap so that the tube cap is reduced in diameter by the fastening member and thereby held to the lead wires.

In the sixth aspect sensor, the tube cap is reduced in diameter together with the heat shield tube. As the tube cap is largely reduced in diameter by the fastening member, it is possible to more reliably hold the tube cap to the lead wires and more reliably hold the heat shield tube in position.

As described above, it is possible according to the present invention to reliably hold the heat shield tube in position and improve the heat resistance of the sensor.

The other objects and features of the present invention will also become understood from the following description.

DESCRIPTION OF EMBODIMENTS

The first embodiment of the present invention will be now described below with reference to FIGS. 1 and 2.

Figure 1:
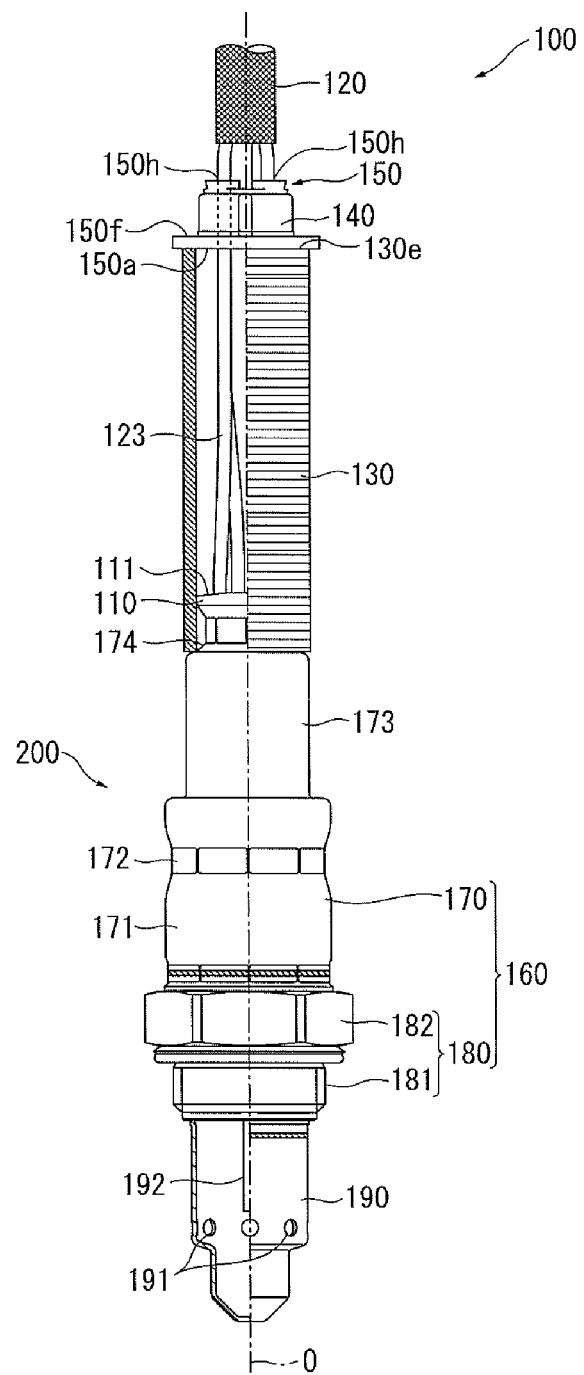
FIG. 1 is a side view, partially in cross section, of a sensor according to a first embodiment of the present invention.

FIG. 1 is a side view, partially in cross section, of an oxygen sensor 100 (as a sensor) according to the first embodiment of the present invention. In FIG. 1, the cross section is taken along the direction of an axis O of the oxygen sensor 100. This oxygen sensor 100 is adapted for mounting on an exhaust pipe (not shown) of an automotive vehicle to detect the concentration of oxygen in an exhaust gas. In the case where the exhaust pipe reaches a high temperature of e.g. 800° C. under the influence of heat from the exhaust gas, the oxygen sensor 100 becomes also heated to a high temperature. Further, heat may be externally applied to the oxygen sensor 100. For these reasons, it is required that the oxygen sensor 100 takes measures against heat.

As shown in FIG. 1, the oxygen sensor 100 includes a sensor body 200 located on a front end side thereof and a heat shield tube 130 located on a rear end side thereof.

The sensor body 200 has: a cylindrical case 160 made of a metal material and extending in the direction of the axis O; and a sensor element 192 accommodated in the case 160. In the first embodiment, the case 160 includes: a cylindrical metal shell 180; and an outer tube 170 welded to the metal shell 180 so as to be in communication with a rear end opening of the metal shell 180.

The metal shell 180 is made of a heat-resistant metal material such as stainless steel, and includes a thread portion 181 formed on a front end part thereof for mounting the oxygen sensor 100 to the exhaust pipe; and a tool engagement portion 182 formed rearward of the thread portion 181. The tool engagement portion 182 is set larger in outer diameter than the thread portion 180 when viewed in a plane perpendicular to the direction of the axis O (hereinafter referred to as "perpendicular plane"), and is shaped such that a tool for mounting the oxygen sensor 100 is engaged on the tool engagement portion 182.

The sensor element 192 is arranged along the direction of the axis O in the case 160. In the first embodiment, the sensor element 192 has a plate-shaped laminated structure that extends in the direction of the axis O and includes an element unit with a detector for detecting oxygen as a detection target substance and a heater unit for heating the element unit. The sensor element 192 is fixed in the metal shell 180, with a front end part of the sensor element 192 being exposed frontward from a front end opening of the metal shell 180 (thread portion 181).

A protector 190 is attached to a front end part of the metal shell 180 such that the exposed front end part of the sensor element 192 is covered with the protector 190. The protector 190 is made of a heat-resistant metal material such as stainless steel, and includes: a cylindrical rear end portion communicating at a rear end opening thereof with the front end opening of the thread portion 181; and a cap-shaped front end portion smaller in outer diameter than the rear end portion when viewed in the perpendicular plane. A plurality of gas passage holes 191 are formed in the rear end portion of the protector 190 so as to allow passage of the exhaust gas therethrough.

The outer tube 170 is made of a heat-resistant metal material such as stainless steel, and includes: a large-diameter portion 171 formed on a front end side thereof; and a small-diameter portion 173 formed integral with and rearward of the large-diameter portion 171. The large-diameter portion 171 is welded at a rear end thereof to the front end part of the metal shell 180. A part of the large-diameter portion 171 slightly rearward of a midpoint thereof in the direction of the axis O is radially inwardly swaged to form a front-side swaged section 172. The small-diameter portion 173 is set smaller in outer diameter than the large-diameter portion 171 when viewed in the perpendicular plane. A rear end part of the small-diameter portion 173 is radially inwardly swaged to form a rear-side swaged section 174.

The oxygen sensor 100 further includes a grommet 110 (as a seal member) and a plurality of lead wires 123 (in the first embodiment, five lead wires 123) as shown in FIG. 1.

The grommet 110 is made of an elastic material such as fluorocarbon rubber in a substantially circular column shape. A front end part of the grommet 110 is fitted in a rear end part of the outer tube 170 such that a rear end opening of the outer tube 170 is closed by the grommet 110, whereas a rear end part of the grommet 110 protrudes rearward from the outer tube 170. The grommet 110 is held in the rear end part of the outer tube 170 by means of the rear-side swaged section 174.

Although not specifically shown in FIG. 1, an insulating separator is disposed in the outer tube 170 at a position frontward of the grommet 110. This separator is made of an insulating material such as alumina and is held in the outer tube 170 by means of the front-side swaged section 172.

The lead wires 123 serve as signal lines to take out a detection signal from the sensor element 192 and transmit a drive signal to drive the oxygen sensor 100. Each of the lead wires 123 is electrically connected at one end thereof to the sensor element 192 and extends from inside to outside of the case 160 in the direction of the axis O. The lead wires 123 are inserted through respective insertion holes (not shown) of the grommet 110 and drawn out from a rear end surface 111 of the grommet 110. Each of the lead wires 123 is then connected at the other end thereof to a connector (not shown) which is coupled to a sensor control device of the vehicle.

The heat shield tube 130 has a cylindrical shape extending in the direction of the axis O. Both of outer and inner surfaces of the heat shield tube 130 are made of a material higher in thermal conductivity than the material of the grommet 110. In the first embodiment, for example, the heat shield tube 130 is formed by bending a laminated material in which a thermal barrier layer of glass fiber is sandwiched between metal foils such as aluminum foils into a bellows-like shape. A front end of the heat shield tube 130 is brought into contact with the outer tube 170 at a position frontward of the grommet 110. More specifically, the front end of the heat shield tube 130 is loosely fitted to a taper part of the rear-side swaged section 174 of the outer tube 170. The heat shield tube 130 is located radially apart from the grommet 110 so as to circumferentially surround the whole of the grommet 110 and rear end parts of the lead wires 123 protruding from the rear end of the grommet 110.

As mentioned above, the outer surface of the heat shield tube 130 is formed by the metal foil. Even when the outside environment of the oxygen sensor 100 reaches a high temperature, heat from the outside is reflected by the outer surface of the heat shield tube 130 and prevented from being transferred to the grommet 110 and the lead wires 123 inside the heat shield tube 130. Furthermore, the thermal barrier layer is provided between the inner and outer surface of the heat shield tube 130. By the thermal barrier layer, heat is prevented from being transferred from the outer surface to the inner surface of the heat shield tube 130. Herein, a glass fiber is applied to the inner surface of the heat shield tube 130.

In the first embodiment, the oxygen sensor 100 includes: a substantially circular column-shaped tube cap 150 made of an elastic material such as fluorocarbon rubber and attached to a rear end part of the heat shield tube 130; and a metal ring 140 (as a fastening member) crimp-fitted to the tube cap 150.

Figure 2:
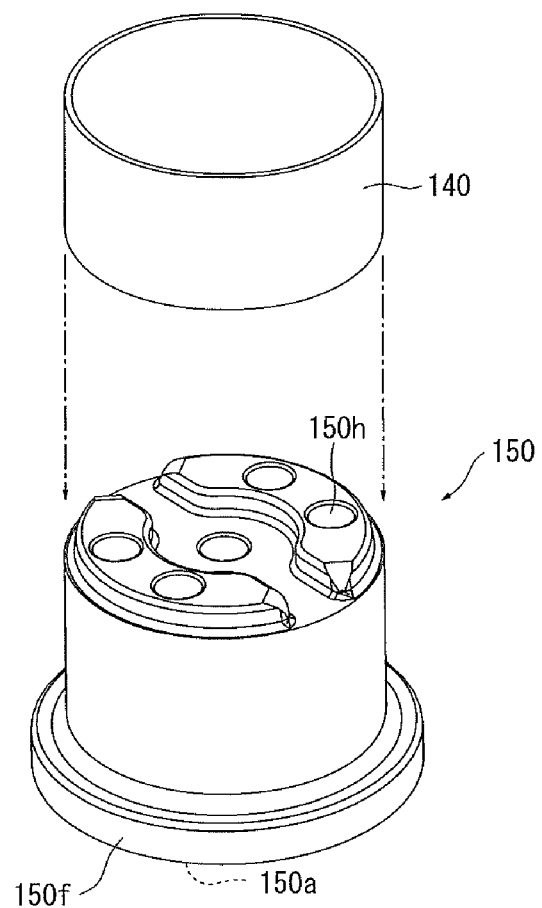
FIG. 2 is a perspective view of a tube cap and a metal ring of the sensor according to the first embodiment of the present invention.

FIG. 2 is a perspective view of the tube cap 150 and the metal ring 140. As shown in FIG. 2, five lead wire insertion holes 150h are formed in the tube cap 150 in the direction of the axis O such that the five lead wires 123 are respectively inserted through the lead wire insertion holes 150h and drawn rearward from the tube cap 150.

By crimp-fitting the metal ring 140 to the tube cap 150, the tube cap 150 is reduced in diameter and thereby held to the lead wires 123 so as to restrict a rearward movement of the heat shield tube 130. More specifically, a rear end part of the tube cap 150 is exposed rearward from the heat shield tube 130; and the metal ring 140 is crimp-fitted on an outer surface of the exposed rear end part of the tube cap 150.

Further, a flange portion 150f is formed on a front end part of the tube cap 150 with a larger outer diameter than that of the heat shield tube 130 so that a front-facing surface 150a of the flange portion 150f is brought into contact with a rear-facing surface 130e of the heat shield tube 130 as shown in FIG. 2. A frontward/rearward movement of the heat shield tube 130 is thus prevented by retaining the rear end (rear-facing surface 130e) of the heat shield tube 130 by the flange portion 150f of the tube cap 150 and retaining the front end of the heat shield tube 130 by the taper part of the rear-side swaged section 174 of the outer tube 170.

The plurality of lead wires 123 drawn out from the rear end of the tube cap 150 are combined into one and covered with a protection tube 120. The protection tube 120 is in the form of a flexible, cylindrical braid made of glass fiber.

In the first embodiment, the tube cap 150 is reduced in diameter by crimp-fitting of the metal ring 140, with the lead wires 123 being inserted through the tube cap 150. As the tube cap 150 is provided as an elastic cap member, inner walls of the lead wire insertion holes 150h of the tube cap 150 are securely brought into close contact with the outer surfaces of the lead wires 123 by diameter reduction of the tube cap 150. It is thus unlikely that, even when an external force is exerted in the direction of the axis O, the tube cap 150 will be moved relative to the lead wires 123. As a consequence, it is possible to reliably hold the tube cap 150, that is, reliably hold the heat shield tube 130 whose rearward movement is restricted by the tube cap 150, whereby the oxygen sensor 100 is improved in heat resistance.

In particular, the five lead wire insertion holes 150h are formed in the tube cap 150 such that the lead wires 123 are respectively inserted through the lead wire insertion holes 150h in the first embodiment. By diameter reduction of such a tube cap 150, the inner walls of the lead wire insertion holes 150h are securely brought into close contact with the respective outer surfaces of the lead wires 123. It is thus possible to more reliably prevent a movement of the tube cap 150 relative to the lead wires 123 when an external force is exerted in the direction of the axis O. It should be however noted that the present invention is not limited to this embodiment and includes the case where the tube cap 150 has formed therein one lead wire insertion hole through which all of the plurality of lead wires 123 are inserted together.

Figure 3:
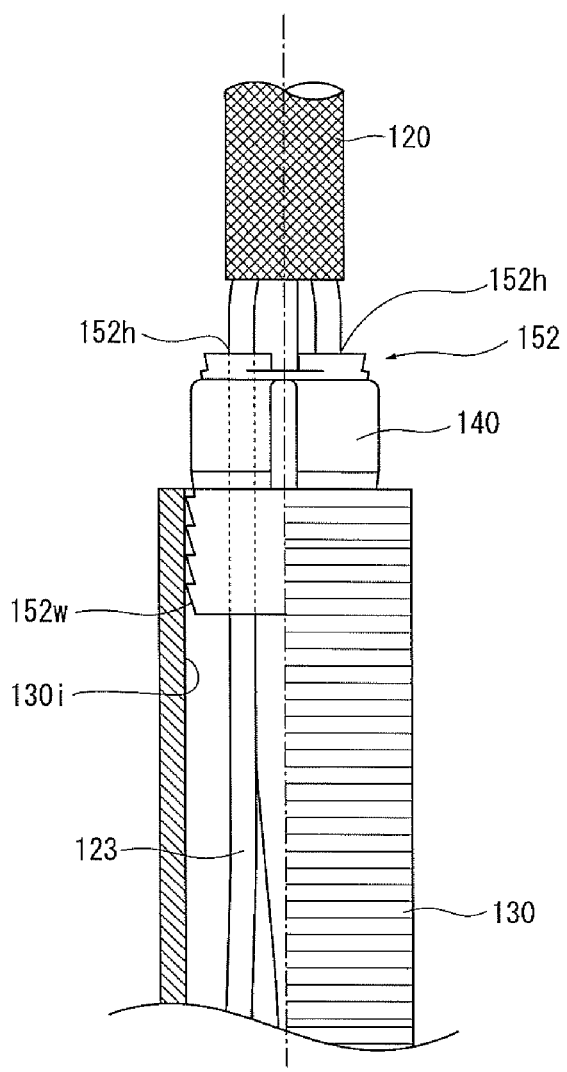
FIG. 3 is a schematic view of a modification of the first embodiment of the present invention.

FIG. 3 is a schematic view of a modification of the first embodiment in which a tube cap 152 is used in place of the tube cap 150. Although the heat shield tube 130 is retained to the tube cap 150 by contact of the front-facing surface 150a of the tube cap 150 with the rear-facing surface 130e of the heat shield tube 130 as shown in FIG. 1 in the first embodiment, the tube cap 152 may alternatively be used by being retained to a side wall 130i of the heat shield tube 130 as shown in FIG. 3.

More specifically, the tube cap 152 includes an insertion portion 152w formed on a front end part thereof to be inserted into the rear end part of the heat shield tube 130. The insertion portion 152w is in the shape of a barb fitting with a plurality of circumferentially continuous radial protrusions. These protrusions have tapered barbs, whose cross sections are tapered down toward the front in the direction of the axis O, so as to prevent the front end portion 152 from coming out of the heat shield tube 130. The heat shield tube 130 is hence reliably held in position by retaining the front end portion 152w of the tube cap 152 to the side wall 130i of the heat shield tube 130. Even in this modification example, the tube cap 152 is reduced in diameter by crimp-fitting the metal ring 140 to the tube cap 152, with the lead wires 123 being inserted through lead wire insertion holes 152h of the tube cap 152, and thereby held to the lead wires 123.

It should be noted that: the configuration for retaining the front end portion 152w of the tube cap 152 to the side wall 130*i* of the heat shield tube 130 is not limited to the above shape and can be any means that increases friction between the front end portion 152*w* of the tube cap 152 and the side wall 130*i* and the heat shield tube 130 (e.g. with the formation of fine projections and depressions on the front end portion 152*w* of the tube cap 152).

For example, the above-structured sensor 100 can be manufactured by the following procedure.

The lead wires 123 are inserted through the tube cap 150 and the grommet 110. The grommet 110 is placed in the heat shield tube 130 and the outer tube 170. Further, the insulating separator (not shown) is placed in the outer tube 170. The rear end parts of the lead wires 123 protruding frontward from the grommet 110 are inserted through the insulating separator. Herein, coatings have been removed from the front end parts of the lead wires 123 so that wire cores are exposed. Metal terminals (not shown) are crimped to these exposed wire cores of the lead wires 123.

On the other hand, the sensor element 192 and the protector 190 are assembled to the metal shell 180. The sensor element 192 of the thus-obtained assembly is placed in the insulating separator, and electrode pads of the sensor element 192 are electrically connected to the metal terminals within the insulating separator. The outer tube 170 is fitted and welded to the metal shell 180, thereby assembling the sensor body 120 and the case 160 together.

The metal ring 140 is then fitted around and crimped onto the tube cap 150, with the front-facing surface 150*a* of the tube cap 150 being in contact with the rear-facing surface of the heat shield tube 130. Finally, the lead wires 123 drawn out from the rear end of the tube cap 150 are covered with the protection tube 120.

Next, the second embodiment of the present invention will be explained below with reference to FIGS. 4 and 5.

Figure 4:
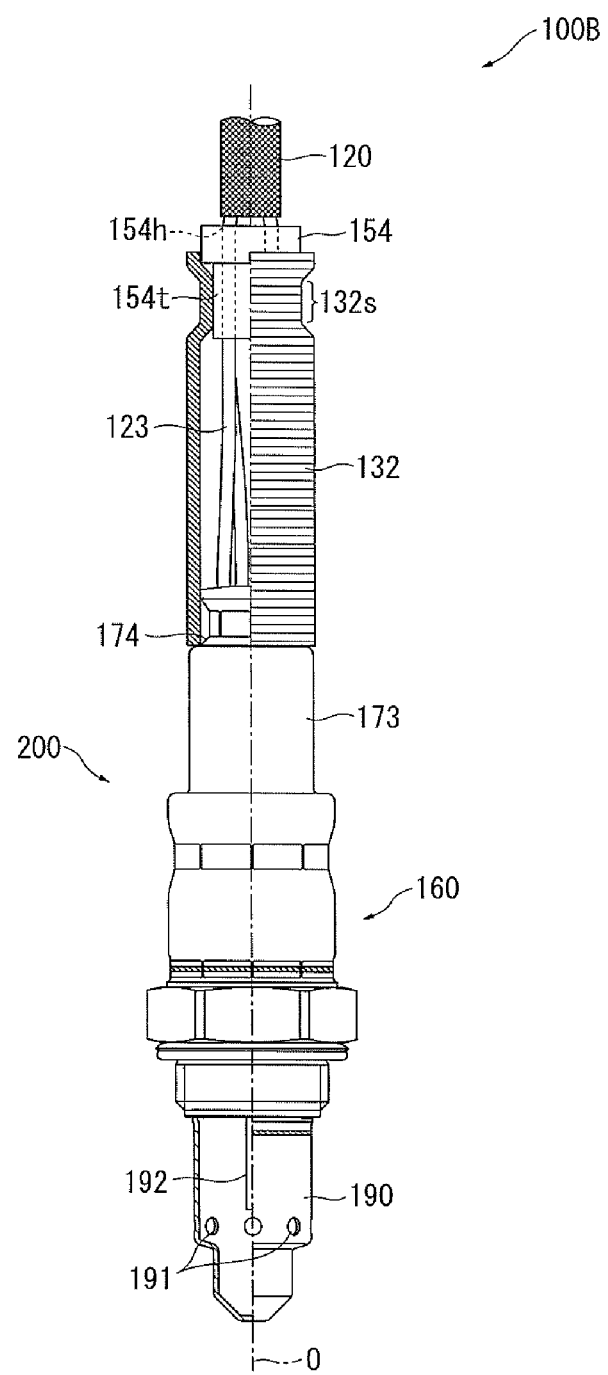
FIG. 4 is a side view, partially in cross section, of a sensor according to a second embodiment of the present invention.

FIG. 4 is a side view, partially in cross section, of an oxygen sensor 100B (as a sensor) according to the second embodiment of the present invention.

As shown in FIG. 4, the oxygen sensor 100B includes: a sensor body 200 located on a front end side thereof; a heat shield tube 132 located on a rear end side thereof; and a tube cap 154 attached to a rear end part of the heat shield tube 132. The oxygen sensor 100B of the second embodiment is structurally the same as the oxygen sensor 100 of the first embodiment, except for the configuration for fixing of the tube cap 154 to the heat shield tube 132 and the tube cap 154. Hence, the same parts and portions of the second embodiment as those of the first embodiment are designated by the same reference numerals; and descriptions thereof are omitted herefrom.

In the second embodiment, the tube cap 154 is made of an elastic material such as fluorocarbon rubber in a substantially circular column shape, and includes an insertion portion 154*t* formed on a front end part thereof to be inserted in a rear end part of the heat shield tube 132. The lead wires 123 are inserted through lead wire insertion holes 154*h* of the tube cap 154. A part of the heat shield tube 132 is externally swaged to form a swaged section 132*s* at a position corresponding to the insertion portion 154*t* of the tube cap 154. By such swaging, the tube cap 154 is reduced in diameter together with the heat shield tube 132 and thereby held to the lead wires 123 so as to restrict a frontward/rearward movement of the heat shield tube 132.

As in the first embodiment, the plurality of lead wires 123 drawn out from the rear end of the tube cap 154 are combined into one and covered with the protection tube 120 in the second embodiment.

As mentioned above, the tube cap 154 is reduced in diameter, with the lead wires 123 being inserted through the tube cap 154, in the second embodiment as in the first embodiment. As the tube cap 154 is provided as an elastic cap member, inner walls of the lead wire insertion holes 154*h* of the tube cap 154 are securely brought into close contact with respective outer surfaces of the lead wires 123. It is thus unlikely that, even when an external force is exerted in the direction of the axis O, the tube cap 154 will be moved relative to the lead wires 123. As a consequence, it is possible to reliably hold the tube cap 154, that is, reliably hold the heat shield tube 132 whose rearward movement is restricted by the tube cap 154, whereby the oxygen sensor 100B is improved in heat resistance.

Figure 5:
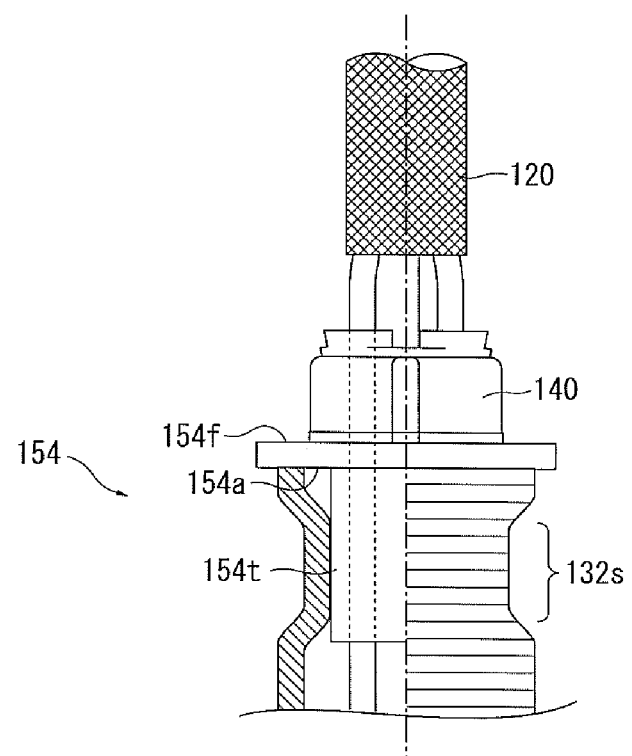
FIG. 5 is a schematic view of a modification of the second embodiment of the present invention.

FIG. 5 is a schematic view of a modification of the second embodiment, in which a metal ring 140 is fitted on the tube cap 154.

In the second embodiment, the heat shield tube 132 is swaged externally to the tube cap 154. In the case where the heat shield tube 132 is low in strength, the heat shield tube 132 may be broken by too strong swaging force. It is thus necessary to regulate the swaging force to a level that does not cause breakage of the heat shield tube 132. In this case, however, there may occur a movement of the tube cap 154 relative to the lead wires 123 or movement of the heat shield tube 132 relative to the tube cap 154 under the action of the external force. The tube cap 154 is hence more reliably held to the lead wires 123 by crimp-fitting the metal ring 140 on a rear end part of the tube cap 154 exposed rearward from the heat shield tube 132 as shown in FIG. 5 in the second embodiment as in the first embodiment.

Furthermore, the heat shield tube 132 is more reliably retained to the tube cap 154 by forming a flange portion 154*f* on the tube cap 154 and bringing a front-facing surface 154*a* of the flange portion 154*f* into contact with the rear end of the heat shield tube 132 as in the first embodiment.

The above-structured sensor 100B can be manufactured by the same procedure as mentioned above.

Although the present invention has been described with reference to the above embodiments, the above embodiments are intended to facilitate understanding of the present invention and are not intended to limit the present invention thereto. Various changes and modifications can be made to the above embodiments without departing from the scope of the present invention.

For example, the shape of the tube cap 150, 154 is not limited to those of the above embodiments. There are no particular limitations on the configuration for diameter reduction of the tube cap 150, 152, 154 and on the configuration for restricting a rearward movement of the heat shield tube 130, 132 by the tube cap 150, 152, 154.

As the fastening member, there can be used a wire etc. in place of the metal ring 140.

The shape of the sensor element 192 is not limited to the plate shape. The sensor element 192 may alternatively be cylindrical-shaped.

There is no particular limitation on the kind of the sensor to which the present invention is applied. The present invention is applicable to not only an oxygen sensor, but also a NOx sensor, a wide range sensor and the like.

The entire contents of Japanese Patent Application No. 2018-074482 (filed on Apr. 9, 2018) are herein incorporated by reference. The scope of the present invention is defined with reference to the following claims.

What is claimed is:

1. A sensor, comprising:
    a sensor body having a cylindrical case extending in a direction of an axis of the sensor and a sensor element accommodated in the case and configured to detect a detection target substance;
    lead wires electrically connected to the sensor element and extending from inside to outside of the case;
    a seal member disposed in a rear end part of the case, with the lead wires being inserted through the seal member; and
    a cylindrical heat shield tube retained to an outer surface of the case and extending rearward from a rear end of the case so as to circumferentially surround the whole of the seal member and parts of the lead wires exposed outside from the case,
    wherein the sensor further comprises a cylindrical tube cap made of an elastic material and arranged to restrict a rearward movement of the heat shield tube,
    wherein the tube cap has, formed therein, at least one lead wire insertion hole through which the lead wires are inserted,
    wherein at least a rear end part of the tube cap has an outer surface exposed rearward from the heat shield tube, and
    wherein the sensor further comprises a fastening member formed separately from the heat shield tube and fitted on the exposed outer surface of the tube cap, whereby the tube cap is reduced in diameter by the fastening member and thereby held to the lead wires.

2. The sensor according to claim 1,
    wherein the tube cap has, formed on a front end part thereof, either a front-facing surface brought into contact with a rear-facing surface of the heat shield tube so as to restrict a rearward movement of the heat shield tube, or an insertion portion inserted in a rear end part of the heat shield tube and retained to a side wall of the heat shield tube so as to restrict a rearward movement of the heat shield tube.

3. The sensor according to claim 1,
    wherein the tube cap has the same number of lead wire insertion holes as that of the lead wires so that the lead wires are respectively inserted through the lead wire insertion holes.

4. The sensor according to claim 1,
    wherein the tube cap has a plurality of lead wire insertion holes.

5. A sensor, comprising:
    a sensor body having a cylindrical case extending in a direction of an axis of the sensor and a sensor element accommodated in the case and configured to detect a detection target substance;
    lead wires electrically connected to the sensor element and extending from inside to outside of the case;
    a seal member made of an elastic material and disposed in a rear end part of the case, with the lead wires being inserted through the seal member; and
    a cylindrical heat shield tube retained to an outer surface of the case and extending rearward from a rear end of the case so as to circumferentially surround the whole of the seal member and parts of the lead wires exposed outside from the case,
    wherein the sensor further comprises a cylindrical tube cap made of an elastic material and arranged to restrict a rearward movement of the heat shield tube,
    wherein the tube cap has an insertion portion formed on a front end part thereof,
    wherein at least the insertion portion of the tube cap is inserted in a rear end part of the heat shield tube, and
    wherein the heat shield tube is swaged radially inwardly at a position corresponding to the insertion portion of the tube cap, whereby the tube cap is reduced in diameter together with the radially inwardly swaged portion of the heat shield tube and held to the lead wires.

6. The sensor according to claim 5,
    wherein the tube cap has a front-facing surface formed on the front end part thereof so as to retain the heat shield tube by contact of the front-facing surface with a rear-facing surface of the heat shield tube.

7. The sensor according to claim 5,
    wherein a rear end part of the tube cap has an outer surface exposed rearward from the heat shield tube, and
    wherein the sensor further comprises a fastening member fitted on the exposed outer surface of the tube cap so that the tube cap is reduced in diameter by the fastening member and thereby held to the lead wires.

8. The sensor according to claim 5,
    wherein the tube cap has the same number of lead wire insertion holes as that of the lead wires so that the lead wires are respectively inserted through the lead wire insertion holes.

9. The sensor according to claim 5,
    wherein the tube cap has a plurality of lead wire insertion holes.

* * * * *